Oct. 5, 1926.
L. H. PETER
AERIAL TRAFFIC CONTROL
Filed March 9, 1920   3 Sheets-Sheet 1
1,601,766
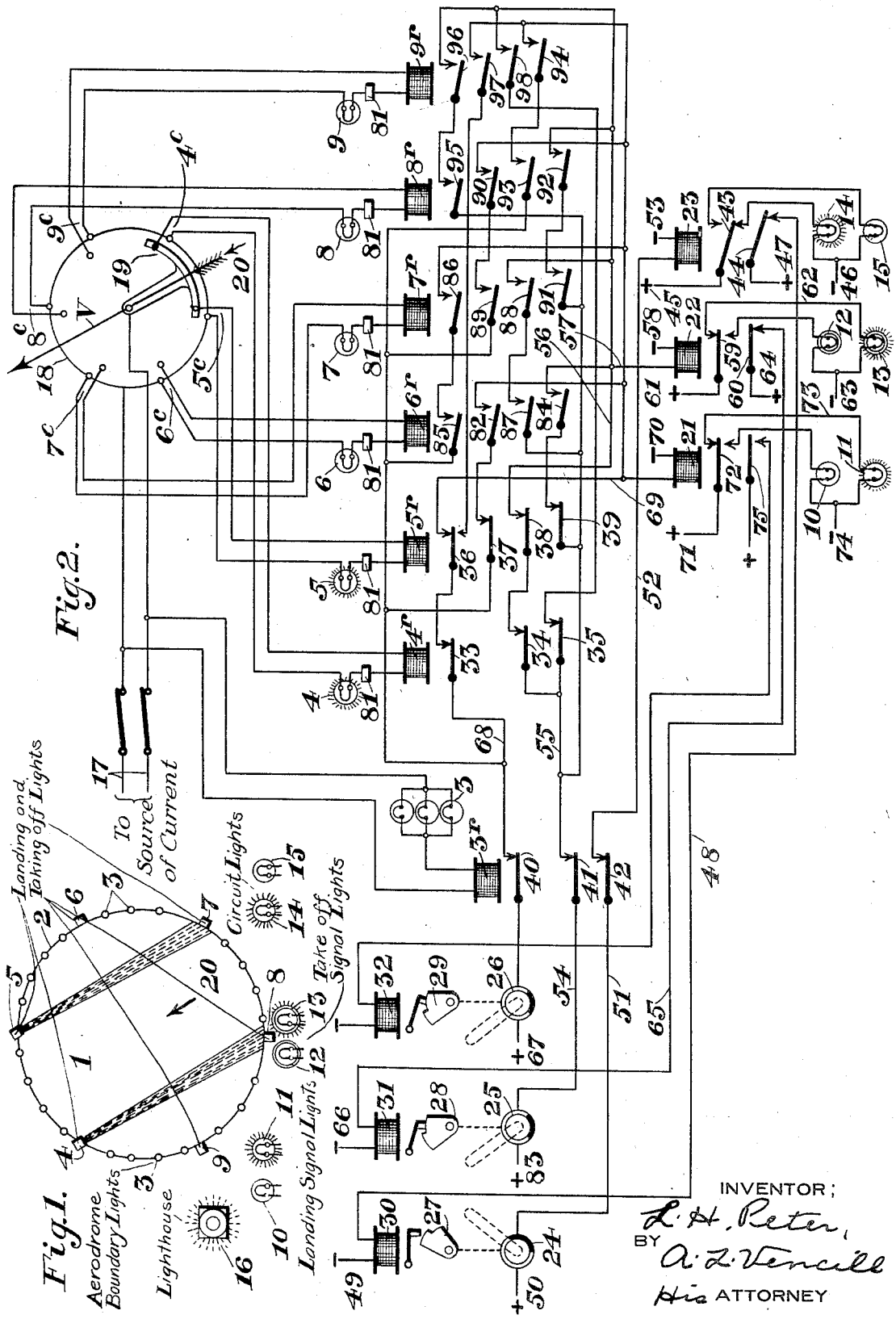

Oct. 5, 1926.
L. H. PETER
1,601,766
AERIAL TRAFFIC CONTROL
Filed March 9, 1920    3 Sheets-Sheet 2
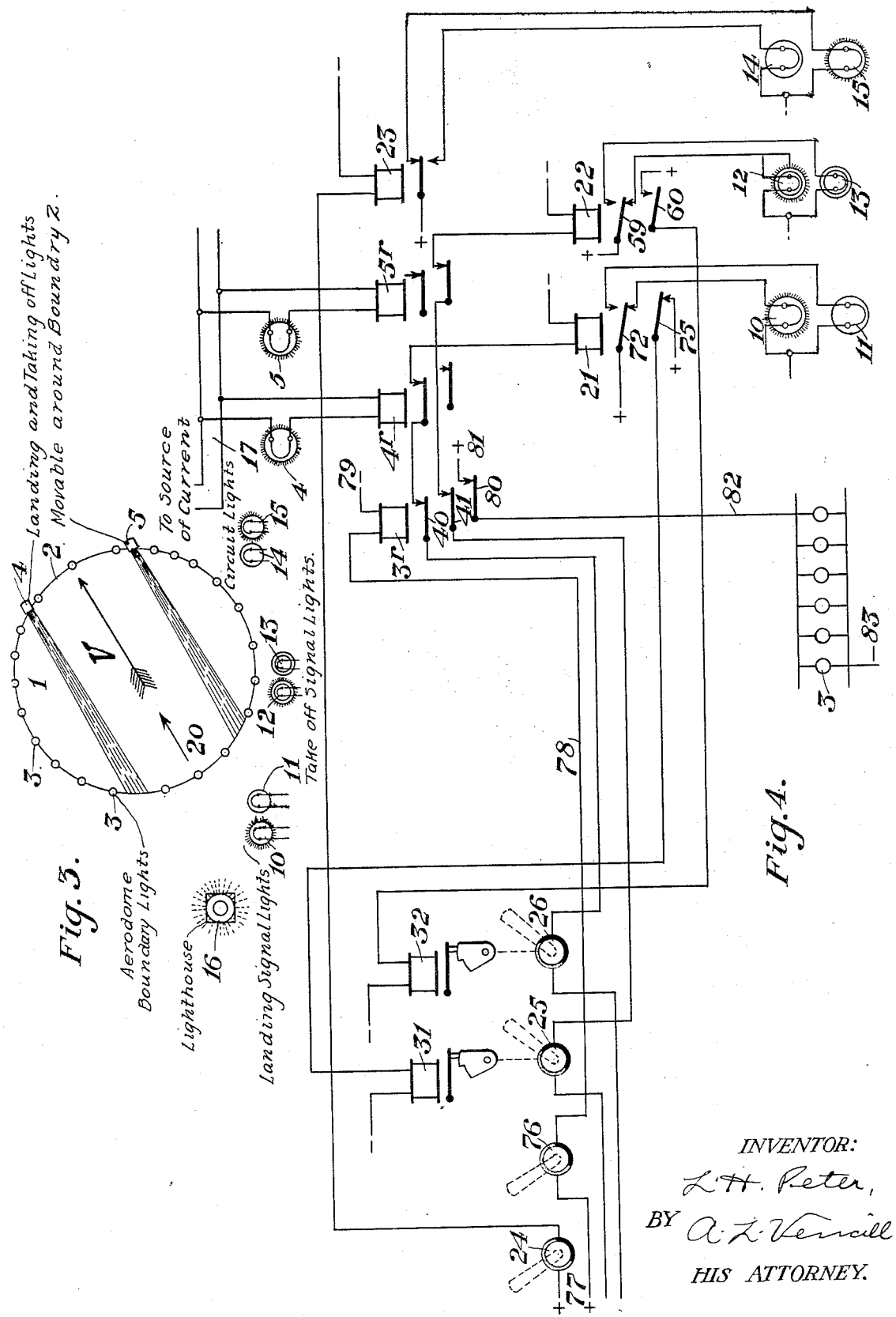

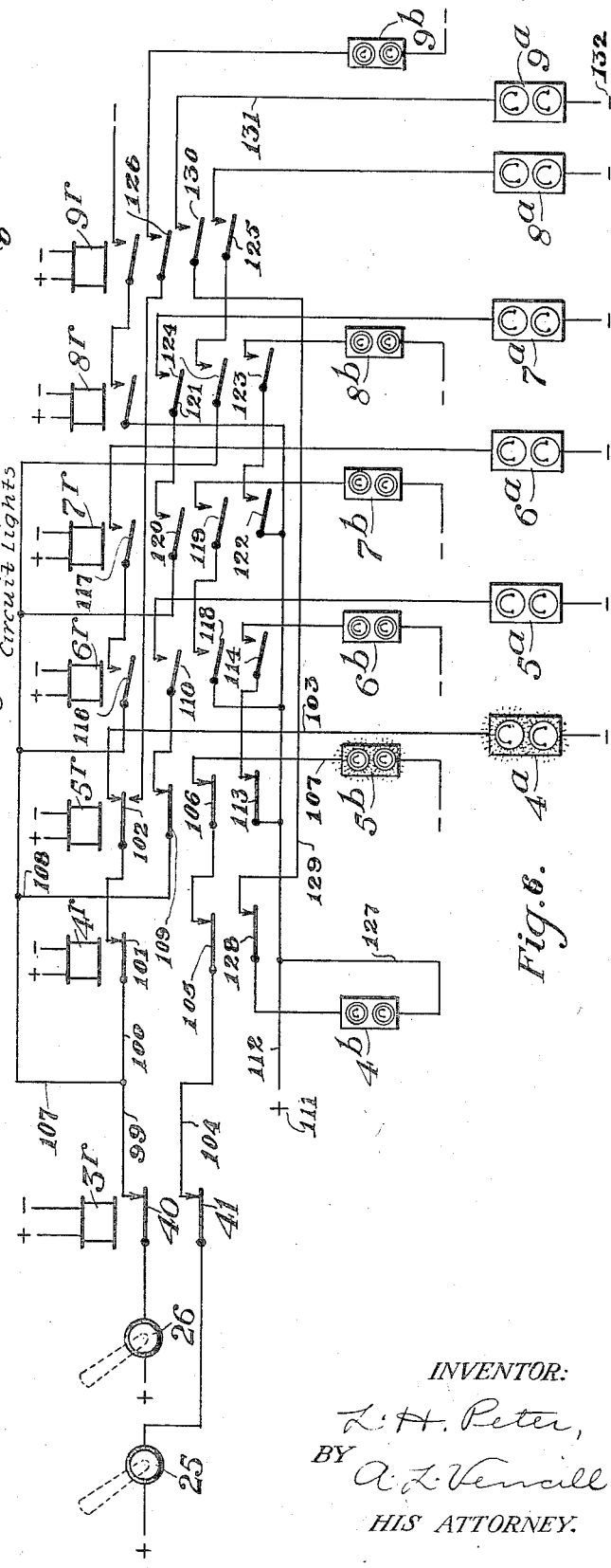

Patented Oct. 5, 1926.

1,601,766

UNITED STATES PATENT OFFICE.

LESLIE HURST PETER, OF LONDON, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

AERIAL-TRAFFIC CONTROL.

Application filed March 9, 1920, Serial No. 364,456, and in Great Britain April 29, 1919.

This invention relates to the control of aerial traffic and has for its object to provide systems of and apparatus for signaling of the special character required by the development of aerial transport whereby greater security and efficiency in the control of incoming and outgoing aircraft from an aerodrome, depot or other central aircraft station may be ensured.

According to the present invention signaling apparatus of suitable character is provided at or adjacent to the aerodrome or depot, the control of the signals being effected by a system of interlocking and indication, whereby conflicting signals as regards aircraft arriving or departing or as regards direction of wind cannot be given.

The invention also contemplates the interlocking of the various signals with other controlling and indicating elements such as search lights and boundary lights in the case of aerial traffic during the hours of darkness.

The invention is illustrated in the accompanying drawings of which:

Figure 1 is a plan view illustrating diagrammatically the general arrangement of a system of night signaling at an aerodrome embodying the invention.

Figure 2 is a diagram of apparatus and connections illustrating one method of controlling the various signaling devices illustrated in Figure 1.

Figure 3 is a diagrammatic view similar to Figure 1 but illustrating a modified signaling system, Figure 4 being the corresponding diagram of control connections.

Figure 5 is a diagrammatic view similar to Figures 1 and 3 and illustrating a further modification, Figure 6 being a diagram of control connections for the system of Figure 5.

Fig. 7 is a view similar to Fig. 1 but showing the direction in which the lights 5 and 6 are trained when these lights are operative.

Referring now to Figure 1 the aerodrome ground 1 is indicated as surrounded by a limiting boundary 2 defined so far as night signaling is concerned by a ring of boundary lights indicated at 3. At a number of points on or adjacent to the boundary 2 are a group of landing and "taking off" lights indicated at 4, 5, 6, 7, 8, 9, respectively. These lights are of the nature of search lights, serving to provide general illumination for the course taken by aircraft arriving at or departing from the aerodrome, and so they may be said to be lights for indicating traffic paths on the aerodrome.

The lights 4 to 9 inclusive are, are shown in Fig. 1, arranged to be employed in adjacent pairs, the right hand light looking along the beam being utilized for illuminating aircraft landing at the aerodrome and the left hand light serving departing aircraft. The particular pair of the lights 4 to 9 inclusive which is operative at any given time will in general be determined in accordance with the local conditions and requirements and will more particularly be dependent upon the direction of the prevailing wind at the time in order that both departing and arriving aircraft may be able to face the direction of the wind whenever possible.

The aerodrome is also provided with landing signal lights indicated at 10 and 11, one of which, namely that indicated at 10 constitutes a danger signal, the other signal light 11 indicating safety. "Take off" or departure signal lights indicated at 12, 13 respectively are also provided, the signal light 12 being a danger signal and signal light 13 a safety signal. A third pair of signal lights indicated at 14, 15 are also provided hereinafter termed circuit lights, the signal lights 14, 15 being differently colored or otherwise rendered distinctive so as to indicate to arriving or departing aircraft whether a right or left hand circuit or curved course is to be taken upon arriving at or departing from the aerodrome according to whether the signal light 14 or 15 is operative. These three groups of lights will hereinafter be referred to broadly as "traffic signals."

The aerodrome is further provided with a lighthouse 16 for indicating the location of the aerodrome to aircraft at a considerable distance therefrom.

In order to control the operation of the traffic path lights 4 to 9 inclusive in accordance with the direction of the prevailing wind the apparatus indicated diagrammatically in the upper right hand corner of Figure 2 may be employed. By reference to this figure it will be seen that the circuit conductors 17 which supply operating current to the lights 4 to 9 inclusive are connected to a ring main 18 and to a rotatable contact segment 19 respectively. The pairs of conductors indicated at 4ᶜ, 5ᶜ, 6ᶜ, 7ᶜ, 8ᶜ, 9ᶜ, supplying the lights 4 to 9 inclusive are connected to the ring main 18 and to fixed contacts adapted to be engaged by the movable contact 19 as the latter rotates, and the contact 19 is arranged to be set into a position depending upon the direction of the prevailing wind by means of any suitable mechanism such for example as a wind vane V.

It will be seen for instance that in the position shown in Figure 2 the movable contact 19 is in such a position to cause operating current to be supplied to the lights 4 and 5, having been set into this position owing to the prevailing wind being in the direction indicated by the arrow 20. Operating current is thus supplied to the lights 4, 5, the remaining lights being inoperative for this direction of wind.

As shown in Fig. 2, the control system for operating the various signal lights of the aerodrome comprises a number of indication relays 4ʳ, 5ʳ, 6ʳ, 7ʳ, 8ʳ, 9ʳ, corresponding respectively to the lights 4 to 9 inclusive. Each of the relays 4ʳ, to 9ʳ, is arranged to be energized, only when its corresponding light is properly operative and these relays thus constitute indication devices and effect by means of their movable armatures the proper connections for automatically controlling the operation of the signal lights of the aerodrome as will be hereinafter explained. As here shown, each indication relay is included in series with the corresponding signal light.

The landing, "take off," and circuit signal lights are also provided with corresponding relays indicated at 21, 22, 23 respectively which control, by means of their corresponding armatures, the supply circuits for operating these signal lights. The boundary lights 3 are also provided with an indication relay 3ʳ which is included in circuit with these lights as illustrated. The control of the signal lights is effected by means of three control switches or levers indicated diagrammatically at 24, 25, 26, the control switch 24 corresponding to the circuit lights 14, 15, the control switch 25 to the "take off" lights 12, 13 and the control switch 26 to the landing lights 10, 11.

The control switches 24, 25, 26, are provided with automatic locks indicated at 27, 28, 29, respectively, adapted to be released by locking magnets 30, 31, 32, as shown in the figure, the construction of these locking arrangements being such that the opening movement of the control switches is effected in two stages the latter of which cannot be completed until the signal setting due to this movement has actually taken place, as explained hereinafter.

The general operation of the signal system shown in Figures 1 and 2 will now be described.

The traffic path lights 4 and 5 having been rendered operative by the action of the automatic control mechanism indicated in Figure 2 in accordance with the wind direction corresponding to that indicated by the arrow 20, the indication relays 4ʳ and 5ʳ are energized provided that the lights 4 and 5 are properly operative. The relay armatures 33, 34, 35 of the relay 4ʳ, and the armatures 36, 37, 38, 39, of the relay 5ʳ, are consequently in their upper or attracted position.

Assuming that the boundary lights 3 have also been rendered properly operative the indication relay 3ʳ will be energized and its armatures 40, 41, 42 will also be in their upper or attracted position. The control switch 24 is indicated as being in its open position and consequently the circuit of the relay 23 is interrupted by the control switch 24 and this relay is de-energized. The armatures 43, 44 of the relay 23 are therefore in their lower or unattracted position with the result that a circuit is completed from a positive terminal 45 of a source of electrical energy through the armature 43, the circuit signal light 14 to the negative terminal 46. The signal light 14 is thus illuminated and a corresponding circuit direction is indicated for aircraft approaching or departing from the aerodrome. Owing to the position of the armature 44 a circuit is also completed from a positive terminal 47 through the armature 44, conductor 48, the locking magnet 30 of the control switch 24, to a negative terminal 49, so that magnet 30 is energized. When the control switch 24 is moved to its closed position a circuit is completed from a positive terminal 50 through the control switch 24, conductor 51, armature 42 of the indication relay 3ʳ, conductor 52 and the relay winding 23, to a negative terminal 53. The relay 23 being thus energized, its armatures 43 and 44 are moved to their upper or attracted position with the result that the circuit between the terminals 45 and 46 includes the other circuit signal light 15, the signal light 14, being rendered inoperative. At the same time owing to the movement of the armature 44 of the relay 23 the circuit through the locking magnet 30 of the control switch 24 is interrupted and the lock 27 is thus rendered operative. When it is desired to restore light 14 to its illuminated condition, the control switch is again moved towards its open position, the lock 27 being arranged to permit sufficient movement of this switch to open the circuit of relay 23. If this relay then actually opens, its contact 47 again closes the circuit for magnet 30 so that the switch may be moved to its full open position as shown in the drawing.

In Figure 2 it will be seen that the control switches 25, 26 are both in their closed position having been moved thereto to give "permission to take off" and "permission to land" signal indications respectively. The circuits completed by the control switches 25, 26 are as follows: from a positive terminal 83 through the control switch 25, conductor 54, armature 41 of the relay 3r, conductor 55, armature 34 of the relay 4r, armature 38 of relay 5r, conductors 56 and 57 relay winding 22 to negative terminal 58. The armatures 59, 60 of this relay are therefore held in their upper or attracted position with the result that a circuit is completed from a positive terminal 61 through the armature 59, conductor 62, signal light 13, to negative terminal 63. The signal light 13 being thus rendered operative a "permission to take off" indication is given. Owing to the fact that the armature 60 is in its upper position it will be noted that the circuit of the locking magnet 31 from a positive terminal 64 through the conductor 65, to the negative terminal 66 is interrupted at the armature 60. The locking magnet 31 is thus de-energized and the lock 28 for the control switch 25 is therefore rendered operative.

The circuit completed through the control switch 26 is from the positive terminal 67, through the control switch 26, armature 40 of relay 3r, conductor 68, armature 33 of relay 4r, armature 36 of relay 5r, conductor 69, relay winding 21 to the negative terminal 70. The relay winding 21 being thus energized a circuit is completed from a positive terminal 71, through the upper relay armature 72 of the relay 21, conductor 73, signal light 11, to a negative terminal 74. The signal light 11 being thus rendered operative a "permission to land" signal indication is given. It will be noted that as in the case of the control switch 25 the circuit of the locking magnet 32 of the control switch 26 is interrupted at the lower armature 75 of the relay 21 and consequently when the control switch 26 has been set into its closed position the lock 29 becomes operative.

It will be readily understood that owing to the provision of the locking devices 27, 28, 29, for the control switches 24, 25, 26, the operation of these switches 24, 25, 26 is effected on the well known "indication" system, that is, to say in opening any of the control switches the opening movement cannot be completed until the change in signal indication effected thereby has actually occurred owing to the fact that the setting of the signal if properly effected causes the lock to be released and thus affords an indication to the operator that the desired setting has been obtained. For example, when it is desired to extinguish the "permission to take off" signal 13 and illuminate signal 12, switch 25 is first moved towards its open position, the lock 28 being arranged to permit sufficient movement in this direction to open the circuit of relay 22. If this relay then actually opens, it closes the circuit for lock magnet 31 so that switch 25 is released and may then be moved to its full open position. The opening of switch 26 is accomplished in similar manner.

As will be seen from the circuits above described the energization of the relays 21, 22, 23 for enabling the corresponding signal indications to be given is dependent upon the indication relay 3r being energized, so that in the event of any failure in operation of the boundary lights 3, the safety signal indications given will be cancelled and replaced by danger signal indications. Furthermore the energization of the relays 21, 22 for giving permission to land and take off is dependent upon the indication relays 4r, 5r being energized, so that in the event of any failure in operation of the lights 4, 5 the permission to land and take off signal indications will be cancelled.

It will be understood that the lights 4 to 9 inclusive and their corresponding relays 4r to 9r inclusive are arranged to be operated in adjacent pairs as above explained and the circuit through which the relay magnets 21 and 22 receive energizing current will be dependent upon the pair of indication relays 4r to 9r inclusive which are operative at a given time. As shown in Fig. 2, the lights 4 and 5 are illuminated so that relays 4r and 5r are energized. The landing signal relay 21 is controlled by contact 33 of relay 4r and contact 36 of relay 5r, so that if either of the corresponding lamps should become extinguished the landing signal relay 21 would become de-energized, whereupon the safe lamp 11 would be extinguished and the danger lamp 10 become illuminated. The departure signal relay 22 is controlled by contact 34 of relay 4r and contact 38 of relay 5r, so that if either light 4 or 5 should become extinguished relay 22 would be de-energized and so would extinguish the safe lamp 13 and illuminate the danger lamp 12. I will now assume that owing to a change in wind direction light 4 becomes extinguished and light 6 becomes illuminated, no change occurring in the condition of light 5. The landing signal relay 21 would then be controlled by contact 37 of relay 5r and contact 82 of relay 6r, while the departure signal relay 22 would then be controlled by contact 39 of relay 5r and contact 84 of relay 6r. The circuits which are then effective for the relays 21 and 22 will be obvious from the drawing, and consequently, they need not be traced in detail. When, owing to a further change in wind direction the lights 6 and 7 become operative, the landing signal 21 will be controlled by contact 85 of relay 6ʳ and contact 86 of relay 7ʳ, while the departure signal relay 22 will then be controlled by contact 87 of relay 6ʳ and contact 88 of relay 7ʳ. Similarly, when lights 7 and 8 are operative, the landing signal relay 21 will be controlled by contact 89 of relay 7ʳ and contact 90 of relay 8ʳ, while the departure signal relay 22 will be controlled by contact 91 of relay 7ʳ and contact 92 of relay 8ʳ. When lights 8 and 9 are operative, the circuit for the landing relay 21 will include contact 93 of relay 8ʳ and contact 94 of relay 9ʳ, while the circuit for the departure signal relay 22 will include contact 95 of relay 8ʳ and contact 96 of relay 9ʳ. When lights 9 and 4 are operative, the circuit for the landing signal relay 21 will include contact 33 of relay 4ʳ, the back point of contact 36 of relay 5ʳ, and contact 97 of relay 9ʳ; while the circuit for the departure signal relay 22 will include contact 35 of relay 4ʳ and contact 98 of relay 9ʳ. In any instance, if one or the other of the landing and take-off lights which are placed in operation should become extinguished, it will be apparent that both of the signal relays 21 and 22 will become de-energized so that the landing and departure signals will both indicate danger.

The operation of the apparatus shown in Figs. 1 and 2 will now be apparent. Assuming that the control of the landing and take-off lights 4 to 9, inclusive, is automatic, the operator at the aerodrome can control only the landing signal lights, the take-off signal lights and the circuit lights. As shown in the drawing, circuit light 14 is illuminated, but in order to extinguish this light and illuminate the circuit light 15, the operator merely reverses the circuit controller 24. To restore these lights to the conditions shown in the drawing, the operator returns circuit controller 24 towards its original position, and if relay 23 responds by opening, it releases the lock 27 so that the return movement of circuit controller 24 may be completed. The operation of circuit controllers 25 and 26 for the control of the landing and departure signal lights has been fully explained hereinbefore.

It will be understood that the direction in which each of the landing and take-off lights 4 to 9 is trained will depend upon whether it is co-operating with one or the other of the next adjacent lights, and this direction or training may be arranged to be effected either manually or by any suitable mechanism. That is to say, the two lights which are illuminated at any one time will be so trained that their beams will be directed transversely across the aerodrome ground 1 and parallel with the direction of the wind. For examples, when lights 4 and 5 are lighted they will be directed as shown in Fig. 1, but when lights 5 and 6 are burning these two lights will be directed or trained as shown in Fig. 7, that is, so that their beams will be parallel with the direction of the wind which in Fig. 7 is assumed to be as indicated by the arrow 20.

Referring now to Figures 3 and 4 a modified arrangement is illustrated in which only two landing and taking off lights 4, 5 are provided, these lights being, however, arranged to be moved so as to occupy various positions at or near the boundary 2 of the aerodrome in accordance with the direction of the wind or other conditions. The position of these lights may be controlled by any suitable means, such for example as by mechanism governed by a wind vane V. The lights 4, 5 are each provided with indication relays 4ʳ and 5ʳ adapted to be energized only when the lights 4, 5 are properly operative, these relays being controlled in the same manner as the corresponding relays in Fig. 2. These indication relays are arranged to control relays 21, 22 for the landing signal lights 10, 11 and the taking off signal lights 12, 13 respectively. The operation of this system is very similar to that of the system described with reference to Figures 1 and 2 except, as will be observed, the control switch 24 for the circuit lights 14, 15 is not shown as provided with any locking mechanism. An additional control switch indicated at 76 is provided for controlling the boundary lights 3, the circuit controlled by this switch being from a positive terminal 77, through the control switch 76, conductor 78, the indication relay 3ʳ, to a negative terminal 79. The relay 3ʳ is in this system provided with armatures 40, 41 controlling the circuits of the relays 21, 22 for the landing and taking off signal lights and with a third armature 80 which in its attracted position completes a circuit from a positive terminal 81, through relay armature 80, conductor 82, through the boundary lights 3, to a negative terminal 83.

The locking arrangements for the control switches 25, 26 differ from those of the corresponding switches in the system shown in Figures 1 and 2 inasmuch as the circuit of the locking magnet 31 for the taking off control switch 25 is controlled by the armature 75 of the relay 21 for landing signal lights. On the other hand the circuit of the locking magnet 32 for the control switch 26 is controlled by the armature 60 of the relay 22 for the taking off signal light. The armature 75 when in its attracted position is arranged to break the circuit of the locking magnet 31 whereas the armature 60 when in a similar position is arranged to complete the circuit of the locking magnet 32. As a result of this arrangement although both the control switches 25 and 26 can be moved to their closed position the control switch 26 cannot be reopened until the control switch 25 has been reopened. If the control switch 25 is open the control switch 26 can be closed but cannot be reopened. These interlocking arrangements of the control switches are merely illustrated by way of example as showing one of a number of different interlocking arrangements which may be adopted to meet particular conditions.

The operation of the apparatus shown in Fig. 4, is as follows:

The control of the boundary lights 3 by the control switch 76 will be apparent from the circuits shown in the drawing; that is, when the control switch 76 is closed, as shown, relay 3$^r$ is energized so that the lights 3 are illuminated. If the operator desires to extinguish these lights he swings the control switch 76 to the open position, thereby de-energizing relay 3$^r$, which in turn opens the circuit for the boundary lights at contact 80. When relay 3$^r$ is de-energized, the circuits for the landing and departure signal relays 21 and 22 are opened at contacts 40 and 41, respectively, so that the landing and departure signals will indicate danger, regardless of any manipulation of the control switches 25 and 26. The operation of the circuit lights 14 and 15 will be apparent from the drawing; that is, when the control switch 24 is closed relay 23 is energized so that light 15 is illuminated. When the operator desires to reverse this signal he swings the control switch 24 to the open position, thereby de-energizing relay 23 which in turn extinguishes light 15 and illuminates light 14.

As shown in the drawing, the control switches 25 and 26 are both open, so that relays 21 and 22 are both open, and the landing and departure indication signals both indicate danger; that is, the lights 10 and 12 are illuminated. When the operator desires to permit an aeroplane to depart from the field, he swings the control switch 25 to the closed position, thereby energizing relay 22 and reversing the condition of the departure signal lights 12 and 13. Magnet 31 then remains energized, due to the fact that contact 75 of the landing signal relay 21 is closed, and hence the operator can at will return the control switch 25 to its open position wherein the departure signal will indicate danger. Similarly, if the operator desires to allow an aeroplane to land on the field, he swings the control switch 26 to its closed position, thereby energizing relay 21 and reversing the condition of the landing signal lights 10 and 11. In order to return the landing control switch 26 to its open position, however, the operator must first close the departure switch 25, thereby energizing relay 22. This operation closes the circuit for lock magnet 32 at contact 60, so that the landing control switch 26 can be returned to its open position. The consequent de-energization of relay 21 closes at contact 75 the circuit for lock magnet 31, so that the departure control switch 25 can then be returned to its open position.

It will, of course, be observed that if the landing light 4 is not illuminated the indication relay 4$^r$ will be open, so that the safe landing signal light 11 cannot be illuminated. Similarly, if the departure light 5 is extinguished the indication relay 5$^r$ will be de-energized, so that the safe departure light 13 cannot be illuminated.

Referring now to Figures 5 and 6 a somewhat more elaborate system of signaling is illustrated in which each of the landing and taking off lights 4 to 9 inclusive is provided with its own landing and taking off signal lights the signal lights for each of the lights 4 to 9 inclusive being indicated at 4$^a$, 5$^a$, 6$^a$, 7$^a$, 8$^a$, 9$^a$, respectively, the corresponding taking off signal lights being indicated at 4$^b$, 5$^b$, 6$^b$, 7$^b$, 8$^b$, 9$^b$, respectively. The landing and take-off lights 4 to 9, inclusive, are operated in adjacent pairs as in Fig. 1, and the pair which is operative at any given time may be selected in the manner set forth in explaining Fig. 1. The control of the circuit lights 14 and 15 is omitted from Fig. 6 to simplify the drawing. The indication relays 3$^r$ to 9$^r$, inclusive, are controlled by the boundary lights and by the landing and take-off lights through the medium of apparatus which may be the same as that shown in Fig. 1, but which is omitted from Fig. 6 to simplify the disclosure.

As shown in Fig. 6, the boundary lights 3 are illuminated and the landing and take-off lights 4 and 5 are operative. The control switches 25 and 26 are both closed, so that the landing signal lights 4$^a$ are illuminated by virtue of a circuit which passes from the positive terminal of a source of current through the control switch 26, contact 40 of indication relay 3$^r$, wires 99 and 100, contact 101 of relay 4$^r$, front point of contact 102 of relay 5$^r$, wire 103 and lights 4$^a$ to the negative terminal of the source of current. The take-off lights 5$^b$ are illuminated by virtue of a circuit which passes from the positive terminal of the source of current through the control switch 25, contact 41 of relay 3$^r$, wire 104, contact 105 of relay 4$^r$, contact 106 of relay 5$^r$, wire 107, and the lights 5$^b$ to the negative terminal of the source of current. Assuming now that the landing and take-off lights 5 and 6 become operative, it is obvious that relay 4$^r$ will open and relay 6$^r$ will close. The landing signal light 5$^a$ will then be illuminated by virtue of a circuit which passes from wire 99, through wires 107 and 108, contact 109 of relay 5$^r$ and contact 110 of relay 6$^r$.

The take-off signal 6ᵇ will be illuminated through a circuit which passes from positive terminal 111, through wire 112, contact 113 of relay 5ʳ and contact 114 of relay 6ʳ. The landing signal 6ᵃ is controlled by contact 116 of relay 6ʳ and contact 117 of relay 7ʳ, whereas the take-off signal 7ᵇ is controlled by contact 118 of relay 6ʳ and contact 119 of relay 7ʳ. Landing signal 7ᵃ is controlled by contact 120 of relay 7ʳ and contact 121 of relay 8ʳ, whereas the take-off signal 8ᵇ is controlled by contact 122 of relay 7ʳ and contact 123 of relay 8ʳ. Landing signal 8ᵃ is controlled by contact 124 of relay 8ʳ and contact 125 of relay 9ʳ, whereas the take-off signal 9ᵇ is controlled by contact 101 of relay 4ʳ, back point of contact 102 of relay 5ʳ and contact 126 of relay 9ʳ. The landing signal 9ᵃ and the take-off signal 4ᵇ are connected in series, the circuit being from positive terminal 111, through wire 112, wire 127, signal 4ᵇ, contact 128 of relay 4ʳ, wire 129, contact 130 of relay 9ʳ, wire 131, and signal 9ᵃ to the negative terminal 132 of the same source of current. These two last-mentioned signals will be illuminated, of course, only when indication relays 4ʳ and 9ʳ are energized, that is, only when the landing and take-off lights 4 and 9 are illuminated. As explained hereinbefore in discussing Figs. 1 and 2, the landing and take-off lights 4 to 9 are shifted in pairs so that the two lights which are burning are directed across the aerodrome in directions parallel to the wind.

It will be seen that the invention is of extremely wide scope and may be embodied in many different types of signaling systems, all however including the essential features of the invention, namely the interlocking and indication of the setting of the signals, illuminating and boundary or position indicating apparatus employed so as to prevent conflicting or otherwise dangerous signals being given.

Having now particularly described and ascertained the nature of my said invention and in what manner the same is to be performed, I declare that what I claim is:—

1. In combination, an aerodrome provided with boundary lights, a circuit for said lights, signals for conveying information to aeroplanes with respect to the aerodrome, and means for controlling said signals partly by means associated with said boundary light circuit.

2. In combination, an aerodrome, means for defining the boundary thereof, a circuit for said means, and landing and taking-off signals controlled partly by means associated with said circuit.

3. In combination, an aerodrome, means for defining the boundary thereof, a signal for conveying information to aeroplanes with respect to the aerodrome, and including means to indicate danger and safety, and means controlled by said first means for preventing said signal from indicating safety if said boundary defining means is not in operation.

4. In combination, an aerodrome, means for defining the boundary thereof, a circuit for said means, traffic signals for conveying information to aeroplanes, with respect to the aerodrome, and means for controlling said signals in part by said boundary defining means.

5. In combination, an aerodrome, means for indicating a traffic path thereon, a traffic signal for the guidance of aeroplane pilots and means for controlling said traffic signal comprising said first named means.

6. In combination, an aerodrome, means for indicating a traffic path thereon, means for indicating the boundary of said aerodrome, a traffic signal for the guidance of aeroplane pilots, and means for controlling said traffic signals comprising both of said first named means.

7. In combination, an aerodrome, a plurality of devices for indicating a traffic path thereon means for operating said devices selectively a traffic signal for the guidance of aeroplane pilots, and means for controlling said signal by whichever of said devices is in operation.

8. In combination, an aerodrome, a plurality of devices for indicating a traffic path thereon, means for operating said devices selectively a traffic signal for the guidance of aeroplane pilots, and arranged to indicate danger and safety, and means for preventing said signal from indicating safety if the particular device which is under selection is not functioning.

9. In combination, an aerodrome, a plurality of devices for indicating a traffic path thereon, means for operating said devices selectively an indication relay for each device, a traffic signal, and means for controlling said signal by said relays.

10. In combination, an aerodrome, means for indicating a traffic path thereon, a traffic signal for conveying information to aeroplanes with respect to said aerodrome and controlled by said means, and manually operable apparatus for the further control of said signal.

11. In combination, an aerodrome, means for defining the boundary thereof, means for indicating a traffic path on said aerodrome, a traffic signal for conveying information to aeroplanes with respect to said aerodrome and controlled by both of said means, and manually operable means for the further control of said signal.

12. In combination, an aerodrome, devices located at intervals around the boundary thereof, means for operating said devices in pairs to indicate traffic paths on said aerodrome, traffic signals each having means to indicate safety and danger, and means for preventing said signals from indicating safety unless a pair of adjacent devices is in operation.

13. In combination, an aerodrome, a plurality of traffic path indicating devices located at intervals around the boundary thereof, means for operating said devices in pairs, a relay for each device responsive to the operative condition of the device, a traffic signal having means to indicate safety and danger, and means controlled by said relays for preventing said signal from indicating safety unless a pair of adjacent devices is in operative condition.

In testimony whereof I affix my signature.

LESLIE HURST PETER.